July 3, 1928.
H. F. GADE
1,675,703
LUBRICATING MEANS FOR LOOSE PULLEYS AND THE LIKE
Original Filed July 19, 1922      2 Sheets-Sheet 1
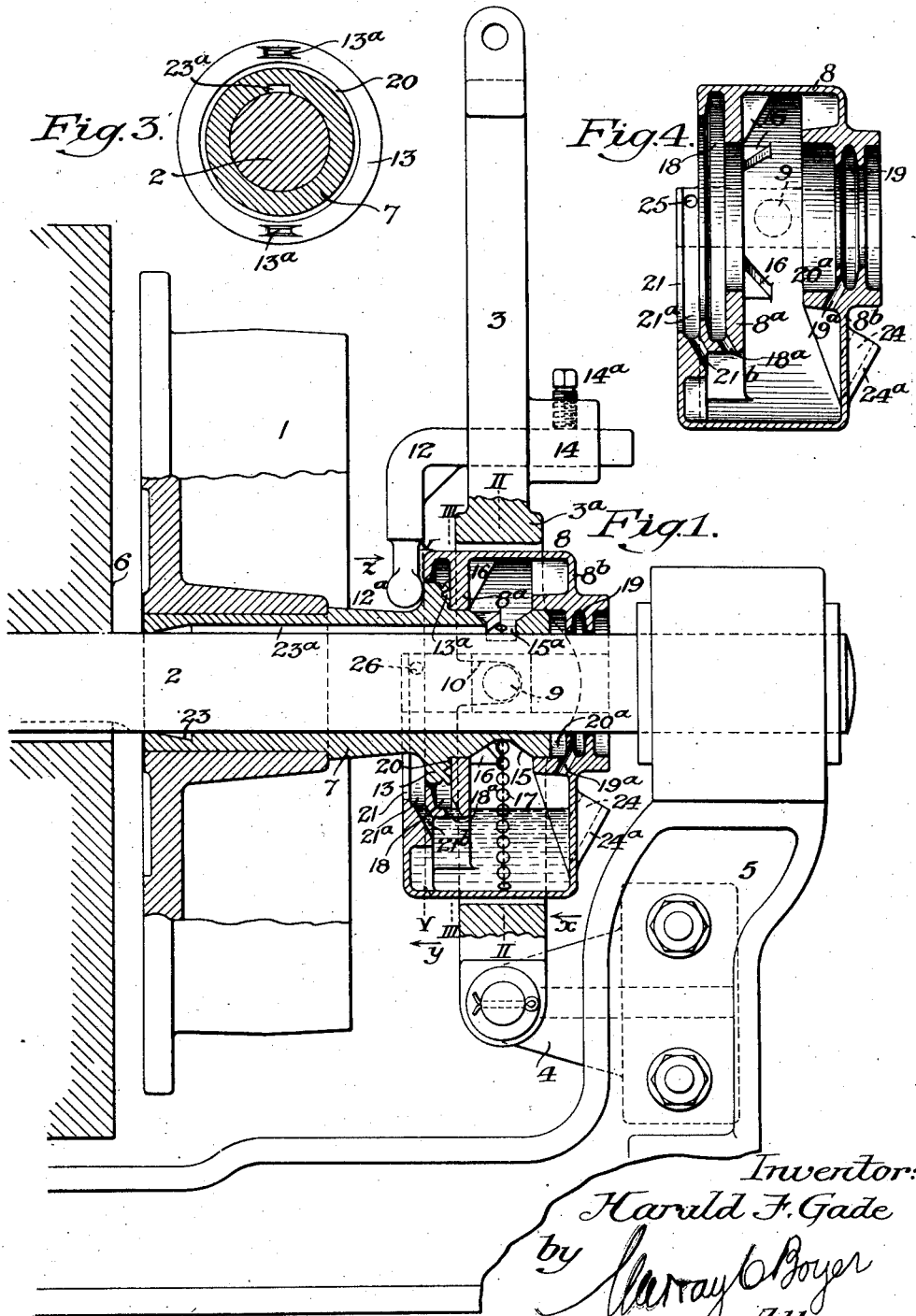
Inventor:
Harold F. Gade
by Murray O. Boyer
Attorney.

July 3, 1928.
H. F. GADE
1,675,703
LUBRICATING MEANS FOR LOOSE PULLEYS AND THE LIKE
Original Filed July 19, 1922   2 Sheets-Sheet 2
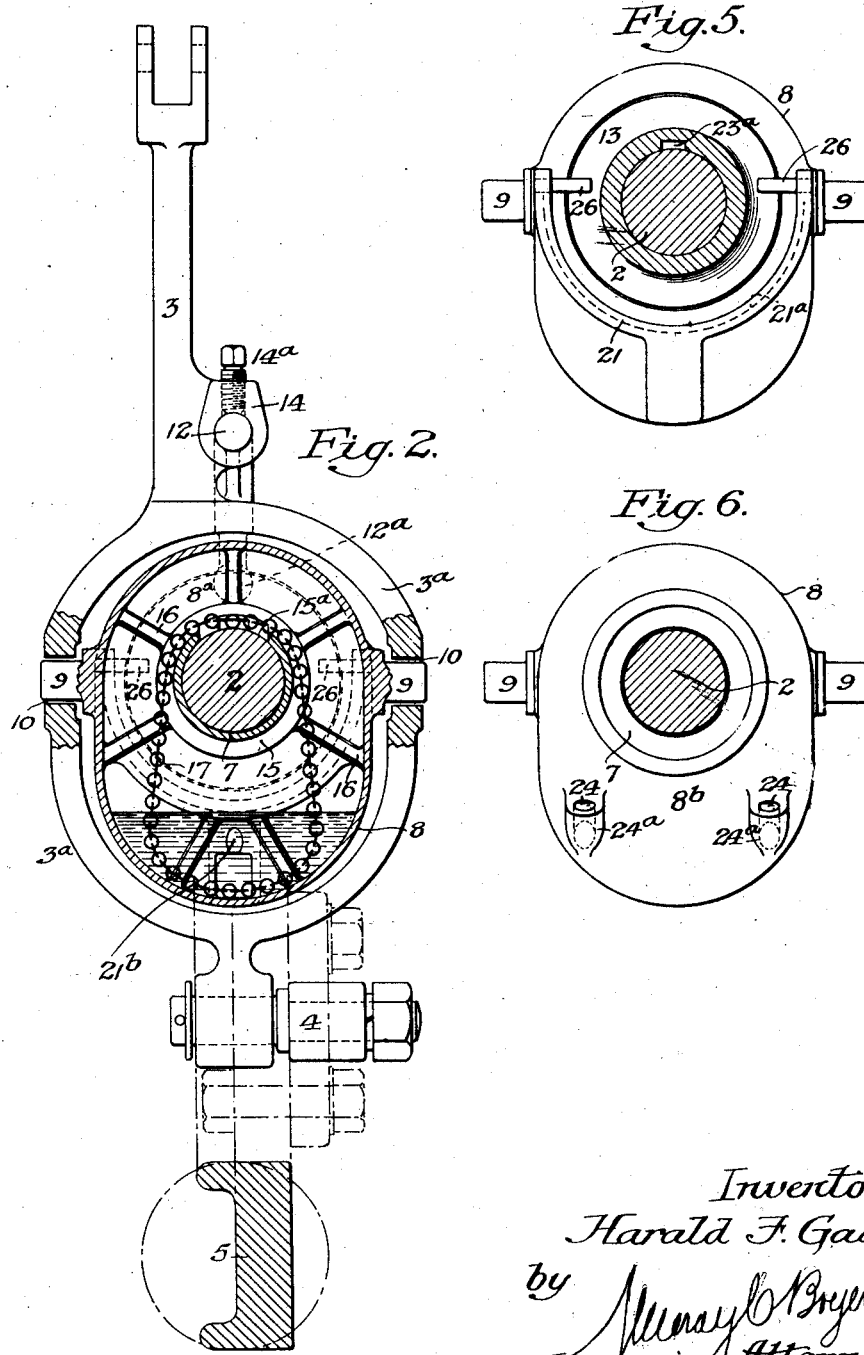

Patented July 3, 1928.

1,675,703

UNITED STATES PATENT OFFICE.

HARALD F. GADE, OF PHILADELPHIA, PENNSYLVANIA, ASSIGNOR TO STANDARD PRESSED STEEL CO., OF JENKINTOWN, PENNSYLVANIA, A CORPORATION OF PENNSYLVANIA.

LUBRICATING MEANS FOR LOOSE PULLEYS AND THE LIKE.

Application filed July 19, 1922. Serial No. 576,022.

One object of my present invention is to provide loose clutch pulleys employed in connection with loom driving mechanism and similar structures, with adequate lubricating means.

A further object of my invention is to provide a special type of bushing or shaft engaging portion for the pulley; such bushing or shaft engaging portion being fast to the pulley and longitudinally movable therewith on the shaft upon which said pulley rotates.

A further object of my invention is to provide a shipper arm in operative engagement with said bushing or shaft engaging portion whereby it, together with the pulley, or similar member, may be moved; movement of the pulley being into and out of clutching engagement with a suitable complemental part.

A further object of my invention is to provide a suitable form of lubricant receptacle surrounding the shaft and movable by the shipper arm with the bushing or other shaft engaging portion and the pulley; said receptacle being held by the shipper arm against movement with respect to said bushing or shaft engaging portion, and against rotation.

A further object of my invention is to provide the bushing or shaft engaging portion with an extension projecting beyond the pulley and having a collar or flange serving as a thrust bearing between it and the oil receptacle and also as a shoulder to be operatively engaged by the shipper arm.

A further object of my invention is to so arrange the bushing or other shaft engaging portion that it will properly accommodate means, usually in the form of a chain, designed to lift lubricant from the lower part of the receptacle and distribute the same to the shaft.

And a still further object of my invention is to provide for proper lubrication of the thrust surfaces between the bushing or other shaft engaging portion and the lubricant-receiving receptacle, which surfaces are in contact and that of the bushing or other shaft engaging portion in motion when the pulley is in operative engagement with its complemental clutching face.

These and other features of my invention are more fully described hereinafter; reference being had to the accompanying drawings, in which:

Figure 1, is a sectional elevation of a structure embodying the features of my present invention.

Fig. 2, is an end elevation of the same looking in the direction of the arrow $x$, Fig. 1, partly in section, on the line II—II.

Fig. 3, is a sectional view of the bushing on the line III—III, Fig. 1, looking in the direction of the arrow $y$.

Fig. 4, is a detached sectional view of the lubricant-receiving receptacle employed with my improved structure.

Fig. 5, is a sectional view on the line V—V, Fig. 1, looking in the direction of the arrow $z$, and Fig. 6, is a view of the opposite side of the lubricant-receiving receptacle.

In the drawings, 1 represents a loose pulley or similar rotating member which may form one part of a clutching device; such pulley being mounted upon a shaft 2, upon which it may rotate and upon which it may be moved longitudinally of said shaft by a properly associated shipper arm or lever 3, which may be pivotally connected to a bracket 4, carried by the frame 5, of a loom or similar machine, whereby the clutching face of said loose pulley may be brought into engagement with a complemental member indicated at 6; such latter member 6 being fixed to the shaft 2 and effecting rotation thereof when the loose pulley is in clutching engagement therewith. A shaft engaging portion, here shown as a bushing 7 in fixed engagement with the loose pulley 1 is interposed between the same and the shaft; such bushing being of a type substantially like that illustrated and described in my application for patent filed December 20, 1921, Serial No. 523,627.

Supported by the free end of the bushing and surrounding the shaft, is a lubricant-receiving shell or cup 8; in the present instance provided with trunnions 9, which may be arranged to engage notched seats 10 formed in a yoke $3^a$ integral with and forming part of the shipper arm 3. The trunnioned arrangement provides for proper engagement with the shipper arm whereby the latter may move the combined structure (the bushing, pulley and the lubricant-receiving shell) in one direction, and in order that movement in the opposite direction may be accomplished, the shipper arm may carry a finger 12, which may be provided with a rounded head 12$^a$ adapted to engage a flange or collar 13, formed on the bushing 7. The opposite end of said finger 12 may pass through a suitable aperture formed in a boss 14 carried by the shipper arm and be secured thereto by a set screw 14$^a$.

The end of the bushing 7, is in working engagement with what may be termed hub portions carried by the walls 8$^a$ and 8$^b$ of the lubricant-receiving shell 8, and said end of the bushing is provided with an annular groove or recess 15, disposed within said shell and having beveled surfaces; the wall of such recess being cut away at 15$^a$, to expose the shaft. As clearly indicated in the drawings, the wall 8$^a$ of the lubricant-receiving shell is in nominal contact with the flange or collar 13 of the bushing, and when the pulley or other member 1 has been placed in clutching engagement with the complemental member 6, such bushing will be in motion with the lubricant-receiving shell at rest, and such flange or collar 13, forms a thrust bearing engaged by said wall 8$^a$ of the lubricant-receiving shell. The wall 8$^a$ therefore constitutes a thrust face and this wall is preferably reinforced by a series of ribs 16.

Adapted to lie in the annular groove or recess 15 in the bushing 7, and being set in motion when the bushing with the loose pulley or other member is rotating, is an oiling ring or chain 17, dipping into the body of lubricant carried by said shell. While in some instances I may employ a plurality of lubricant-distributing elements, in the present instance I have shown a single chain. As the surface of the annular groove or recess 15, is constantly receiving lubricant from the chain during rotation of the bushing; such lubricant will carry up the beveled faces of said recess and find its way between the wall 8$^a$ and the end of the bushing, and pass to the thrust surfaces of said wall 8$^a$ and the flange or collar 13, to lubricate the same. To assist this lubrication, the face of the flange or collar 13 may be provided with recesses indicated at 13$^a$, and clearly shown in Fig. 3, to pick up and temporarily hold small bodies of lubricant. The ribs on the inner surface of the wall 8$^a$ of the lubricant-receiving shell may serve to keep the chain in proper position with relation to the annular groove or recess 15 of the bushing by destroying any tendency of such chain to whirl out of contact with the body of lubricant.

The vertical walls of the shell 8 may be provided with annular grooves or recesses 18 and 19, to catch any oil spreading along the shaft or the outer surface of the bushing, and these recesses may communicate with the interior of the shell receiving the lubricant through passages 18$^a$ and 19$^a$. The flange 13 of the bushing may be annularly grooved at 20, adjacent the wall 8$^a$ of the shell 8, opposite the annular groove 18 of the shell, and the end of the bushing preferably lies within a recess 20$^a$, formed in the wall 8$^b$ of the lubricant-receiving shell; such recess communicating with the passage 19$^a$, so that any lubricant tending to follow the contacting faces will be caught and returned to the body of lubricant in the shell; entering through the passage 19$^a$.

In addition, the outer wall of the lubricant-receiving receptacle may be provided with a flange 21, forming a semi-circular groove or recess 21$^a$ to catch any lubricant which may follow over the flange 13; a passage 21$^b$ leading from the bottom of said groove to the lubricant-receiving chamber.

The end of the bushing disposed within the pulley hub may be provided with an internally disposed annular groove or recess 23, communicating with a longitudinal groove 23$^a$ formed in the inner wall of the bushing, which groove may lead to and through the wall of the annular recess 15, opposite the cut out portion 15$^a$.

When the loose pulley or other member is rotating on the shaft, the free end of the bushing carried thereby moves within the lubricant-receiving shell; and the chain being carried round by the same, will distribute lubricant upon the shaft in its contact with the latter through the opening 15$^a$, and provide the desired lubrication for the loose pulley bushing. Any lubricant moving along the shaft between it and the bushing, will be caught by the annular groove or recess 23, and will be returned to the lubricant-receiving shell via the passage formed by the longitudinal groove 23$^a$.

Under these conditions the thrust faces of the wall 8$^a$ and flange 13 are barely in contact. When, however, the pulley or other member is brought into clutching engagement with the complemental member 6, the pulley and bushing rotate with the shaft, and the thrust bearing provided by the wall 8$^a$ of the shell and the flange 13 require the lubrication which is supplied in the manner described.

The shell 8 may be filled with lubricant through openings 24, formed in bosses 24$^a$, which may be part of one wall of such shell, and these openings may be closed, if desired, by any suitable form of plug.

It will be understood, of course, that my improved lubricating structure is employed with means for moving the shipper arm so that the clutching face of the pulley may be held in engagement with the complemental member 6, when movement of such pulley or other member is desired to effect rotation of the shaft. Such mechanism, of course, forms no part of my invention, which is directed to the means for lubricating the rotating part of the structure including the thrust bearing.

In order that the bushing and lubricant-receiving shell may be held in proper position with respect to each other before assembly with respect to a pulley or other member, the flange 21, of the shell may be apertured at 25, to receive pins 26, permanently placed, which pins lie adjacent the flange 13 of the bushing, but out of contact therewith, when the structure is in use.

It will be understood, of course, that in use the lubricant-receiving shell is maintained in operative relation with the bushing so as to be moved therewith, longitudinally of the shaft, by means of the shipper arm or lever 3, and the finger 12, as clearly illustrated in the drawings.

I claim:

1. In a lubricating device for loose pulleys and the like, the combination with a shaft and a loose pulley journaled on said shaft and movable longitudinally of the same, of a shaft engaging portion operatively connected to said pulley and interposed between the same and the shaft and longitudinally movable with the pulley, a shell receiving a body of liquid lubricant held against rotation and longitudinally movable with the shaft engaging portion and pulley; said shaft engaging portion having a portion projecting into said lubricant-receiving shell, and movable lubricant-distributing means within the shell cooperating with said projecting portion of the shaft engaging portion for distributing lubricant to the same and the shaft.

2. In a lubricating device for loose pulleys and the like, the combination with a shaft and a loose pulley journaled on said shaft and movable longitudinally of the same, of a shaft engaging portion fixed to said pulley and interposed between the same and the shaft, a shell receiving a body of liquid lubricant held against rotation and longitudinally movable with the shaft engaging portion and pulley; said shaft engaging portion having a part projecting into said lubricant-receiving shell, and movable lubricant-distributing means carried by that part of the shaft engaging portion projecting into said lubricant-receiving shell and dipping into a body of lubricant carried by the latter.

3. In a lubricating device for loose pulleys, the combination with a shaft and a loose pulley thereon movable longitudinally of the same, of a shaft engaging portion fixed to said pulley and interposed between the same and the shaft, a shell receiving a body of liquid lubricant held against rotation and in operative engagement with said shaft engaging portion, means for effecting movement of said pulley, shaft engaging portion and shell longitudinally of said shaft; said shaft engaging portion having a part projecting into said lubricant-receiving shell, and movable lubricant-distributing means within the shell cooperating with said projecting part of the shaft engaging portion for distributing lubricant to the same and the shaft.

4. In a lubricating device for loose pulleys, the combination with a shaft and a loose pulley journaled on said shaft and movable longitudinally of the same, of a shaft engaging portion fixed to said pulley and interposed between the same and the shaft, a lubricant-receiving shell held against rotation and in operative engagement with said shaft engaging portion and pulley, means for effecting movement of said pulley, shaft engaging portion and shell longitudinally of said shaft; said shaft engaging portion having an apertured portion projecting into said lubricant-receiving shell, and lubricant-distributing means carried by the shaft engaging portion within the shell and dipping into a body of lubricant carried by the latter.

5. In a lubricating device for loose pulleys, the combination of a shaft, a loose pulley thereon movable longitudinally of the same, a shaft engaging portion fixed to said pulley and interposed between the same and the shaft, a lubricant-receiving shell held against rotation and movable with the shaft engaging portion and pulley on said shaft; said shaft engaging portion having a part projecting into said lubricant-receiving shell and having an opening in said projecting part to expose the shaft, a lever operatively connected with said shell for effecting movement of said pulley, shaft engaging portion and shell longitudinally of said shaft, and lubricant-distributing means carried by that part of the shaft engaging portion projecting into the shell and serving to supply lubricant to the shaft through the opening in the shaft engaging portion.

6. In a lubricating device for loose pulleys, the combination of a shaft, a loose pulley thereon movable longitudinally of the same, a shaft engaging portion fixed to said pulley and interposed between the same and the shaft, a lubricant receiving shell movable with the shaft engaging portion and pulley on said shaft; said shaft engaging portion having a part projecting into said lubricant-receiving shell, a lever operatively connected with said shell for effecting movement of said pulley, shaft engaging portion and shell on said shaft and holding said shell against rotation, and lubricant-distributing means carried by that part of the shaft engaging portion projecting into the shell and dipping into a body of lubricant carried by the latter; said shaft engaging portion having an opening in said projecting portion exposing the shaft for the application of lubricant thereto.

7. In a lubricating device for loose pulleys and the like, the combination with a shaft and a loose pulley journaled on said shaft and movable longitudinally of the same, of a shaft engaging portion carried by said pulley and interposed between the same and the shaft and movable with the pulley, a lubricant-receiving shell held against rotation and longitudinally movable on the shaft with the shaft engaging portion said shaft engaging portion having a part extending into said lubricant-receiving shell and said projecting part having an annular recess with an aperture extending through the wall of the shaft engaging portion to expose the shaft, lubricant-distributing means carried by said recessed portion of the shaft engaging portion and dipping into a body of lubricant carried by said shell; the apertured wall of the recess of said engaging portion permitting the lubricant to reach the shaft, and means for retaining said shaft engaging portion and lubricant-receiving shell in relatively fixed relation longitudinally of the shaft.

8. In a lubricating device for loose pulleys and the like, the combination with a shaft and a loose pulley journaled on said shaft and movable longitudinally of the same, of a shaft engaging portion fixed to said pulley and interposed between the same and the shaft, a lubricant-receiving shell held against rotation and longitudinally movable on the shaft with the shaft engaging portion; said shaft engaging portion having a part with an annular recess extending into said lubricant-receiving shell and the wall of said recess being apertured to expose the shaft, lubricant-distributing means carried by the shaft engaging portion and dipping into a body of lubricant carried by said shell; the aperture in the wall of said shaft engaging portion permitting the lubricant to reach the shaft, and a lever operatively connected to said shell for imparting movement thereto with the pulley and shaft engaging portion longitudinally of the shaft.

9. In a lubricating device for loose pulleys and the like, the combination with a shaft and a loose pulley journaled on said shaft and movable longitudinally of the same, of a shaft engaging portion fixed to said pulley and interposed between the same and the shaft, a lubricant-receiving shell held against rotation and longitudinally movable on the shaft with the shaft engaging portion; said shaft engaging portion having a part with an annular recess extending into said lubricant-receiving shell and the wall of said recess being apertured to expose the shaft, lubricant-distributing means carried by the shaft engaging portion and dipping into a body of lubricant carried by said shell; the aperture in the wall of said shaft engaging portion permitting the lubricant to reach the shaft, a lever operatively connected to said shell for imparting movement thereto with the pulley and shaft engaging portion longitudinally of the shaft, and means carried by said lever retaining the shell and shaft engaging portion together during longitudinal movement in both directions.

10. In a lubricating device for loose pulleys, the combination of a shaft, a loose pulley journaled on said shaft and movable longitudinally of the same, a shaft engaging portion secured to said pulley and interposed between the same and the shaft, a lubricant-receiving shell in operative engagement with said shaft engaging portion for longitudinal movement therewith on said shaft; a part of said shaft engaging portion extending into said lubricant-receiving shell with an aperture through its wall exposing the shaft, a lubricant-distributing chain carried by the shaft engaging portion and dipping into a body of lubricant carried by said shell; the apertured wall of said shaft engaging portion permitting the lubricant to reach the shaft, and a pivotally mounted lever for imparting movement to said lubricant-receiving shell longitudinally of the shaft.

11. In a lubricating device for loose pulleys and the like, the combination with a shaft and a loose pulley journaled on said shaft, of a shaft engaging portion operatively connected to said pulley and interposed between the same and the shaft; said shaft engaging portion projecting beyond the pulley, a lubricant-receiving-shell supported by the projecting end of said shaft engaging portion, a pivotally mounted lever having notched seats operatively connected to said lubricant-receiving shell the latter having trunnions fitting said seats to hold the same against rotative movement, means whereby said lever may effect movement of said shell in both directions, and lubricant-distributing means carried by said shaft engaging portion and dipping into the body of lubricant in said shell.

12. In a lubricating device for loose pulleys, the combination of a shaft, a loose pulley journaled thereon, a shaft engaging portion fixed to the pulley between the same and the shaft; said shaft engaging portion being longitudinally movable on said shaft with the pulley and having a portion extending beyond the latter, a lubricant-receiving shell supported by the extended portion of said shaft engaging portion, a lever operatively connected to said lubricant-receiving shell and preventing rotative movement of the same, means whereby said lever may effect movement of said shell in both directions, lubricant-distributing means carried by said shaft engaging portion and dipping into a body of lubricant within said shell, and means for retaining the shaft engaging portion and lubricant-receiving shell against longitudinal movement relative to each other while permitting rotation of said shaft engaging portion.

13. In a lubricating device for loose pulleys and the like, the combination with a shaft and a loose pulley journaled on said shaft and movable longitudinally of the same, of a shaft engaging portion operatively connected to said pulley and interposed between the same and the shaft and longitudinally movable with said pulley; said shaft engaging portion having a flange, a lubricant-receiving shell held against rotation and movable with the shaft engaging portion and pulley; said shaft engaging portion having a part projecting into said lubricant-receiving shell; said shell having a wall in thrust engagement with the flange of said shaft engaging portion when the pulley is in clutching engagement, and lubricant-distributing means carried by that portion of the shaft engaging portion within the shell and dipping within the body of lubricant carried by the latter whereby lubricant may be conveyed to the thrust surfaces between the flange and said lubricant-receiving shell.

14. The combination, with a shaft and a loose pulley mounted thereon, of a shaft engaging portion fixed to said pulley and having an annular flange intermediate the ends of the same, a receptacle for liquid lubricant supported by and operatively connected with said shaft engaging portion, a member fast to the shaft with which the pulley may engage, means for moving said pulley, shaft engaging portion and lubricant-receiving receptacle longitudinally of the shaft; movement in one direction bringing the pulley into frictional clutching engagement with the complemental member fast to the shaft whereby movement may be imparted thereto by the pulley; one wall of the lubricant-receiving receptacle and the annular flange of the shaft engaging portion constituting a thrust bearing, and means for supplying lubricant to said thrust surfaces.

15. The combination, with a shaft and a loose pulley mounted thereon, of a shaft engaging portion fixed to said pulley and having an annular flange intermediate the ends of the same, a receptacle for liquid lubricant supported by and operatively connected with said shaft engaging portion, the latter having a portion extending into said shell, a member fast to the shaft with which the pulley may engage, means for moving said pulley, shaft engaging portion and lubricant-receiving receptable longitudinally of the shaft; movement in one direction bringing the pulley into frictional clutching engagement with the complemental member fast to the shaft whereby movement may be imparted to the latter by the pulley; one wall of the lubricant-receiving receptacle and the annular flange of the shaft engaging portion constituting a thrust bearing, and means for supplying lubricant to the surface of said shaft engaging portion from which it may flow to said thrust surfaces.

16. The combination, with a shaft and a loose pulley mounted thereon, of a shaft engaging portion secured to said pulley and having an annular flange intermediate the ends of the same, a member fast to the shaft with which the pulley may frictionally engage, a lubricant-receiving receptacle operatively connected with said shaft engaging portion and receiving one end of the same, means for moving said pulley, shaft engaging portion and lubricant-receptacle longitudinally of the shaft; movement in one direction bringing the pulley into frictional engagement with said member fast on the shaft whereby movement may be imparted to the latter by the pulley; one wall of the lubricant-receiving receptacle and the annular flange of the shaft engaging portion constituting a thrust bearing, a movable member, dipping in said lubricant and rising on said shaft engaging portion for raising lubricant onto the latter for delivery to said thrust surfaces.

17. The combination of a shaft, a pulley loose on the shaft, a complemental clutch element fast on the shaft with which said pulley may engage, a shaft engaging portion fixed to said pulley and interposed between the same and the shaft, a lubricant receptacle longitudinally movable on the shaft but fixed against rotation into which the end of said shaft engaging portion extends, complemental thrust bearing surfaces carried by said shaft engaging portion and lubricant receptacle, and a chain for lifting lubricant onto the surface of the shaft engaging portion for passage to said thrust surfaces.

18. The combination of a shaft, a pulley loose on the shaft, a complemental clutch element on said shaft with which the pulley may engage, a shaft engaging portion fixed to said pulley and interposed between the same and the shaft, a lubricant receptacle longitudinally movable on the shaft but fixed against rotation into which one end of said shaft engaging portion extends, complemental thrust bearing surfaces carried by said shaft engaging portion and lubricant receptacle, a flexible chain riding on the shaft engaging portion within the lubricant-receiving receptacle for raising lubricant onto the surface of the shaft engaging portion for distribution to said thrust surfaces, and means for moving the lubricant receptacle, shaft engaging portion and pulley as a unit longitudinally of the shaft; movement in one direction bringing the pulley into frictional clutching engagement with the complemental clutch element fast to the shaft.

19. The combination of a shaft, a pulley loose on the shaft, a complemental clutch element on said shaft with which the pulley may engage, a shaft engaging portion fixed to said pulley and interposed between the same and the shaft, a lubricant receptacle longitudinally movable on the shaft but fixed against rotation into which the end of said shaft engaging portion extends, complemental bearing surfaces carried by said shaft engaging portion and receptacle, means for raising lubricant to the surface of the shaft engaging portion, lubricant-receiving grooves formed in the receptacle for directing lubricant to said thrust surfaces, a lever for moving the lubricant receptacle, shaft engaging portion and pulley as a unit longitudinally of the shaft; movement in one direction bringing the pulley into frictional clutching engagement with the complemental clutch-element fast to the shaft whereby the latter may be turned by the pulley.

20. The combination with a pulley bushing having an annular flange intermediate its ends, of a receptacle for liquid lubricant supported by one end of said bushing and having a wall in thrust engagement with said flange, means for holding said lubricant receptacle against rotation, means for maintaining said receptacle against endwise movement with respect to the bushing, and movable means for lifting and distributing lubricant on the surface of said bushing for passage to said thrust surfaces.

In witness whereof I have signed this specification.

HARALD F. GADE.